United States Patent
Das Sharma

(10) Patent No.: US 11,444,829 B2
(45) Date of Patent: Sep. 13, 2022

(54) LINK LAYER COMMUNICATION BY MULTIPLE LINK LAYER ENCODINGS FOR COMPUTER BUSES

(71) Applicant: Intel Corporation, Santa Clara, CA (US)

(72) Inventor: Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 33 days.

(21) Appl. No.: 16/788,434

(22) Filed: Feb. 12, 2020

(65) Prior Publication Data

US 2020/0186414 A1    Jun. 11, 2020

Related U.S. Application Data

(60) Provisional application No. 62/897,546, filed on Sep. 9, 2019.

(51) Int. Cl.

| | |
|---|---|
| *H04L 41/0604* | (2022.01) |
| *H04L 69/22* | (2022.01) |
| *H04L 41/0816* | (2022.01) |
| *G06F 13/42* | (2006.01) |
| *H04L 41/0654* | (2022.01) |
| *H04L 43/0888* | (2022.01) |
| *H04L 41/00* | (2022.01) |
| *H04L 67/12* | (2022.01) |

(Continued)

(52) U.S. Cl.
CPC ...... *H04L 41/0672* (2013.01); *G06F 13/4226* (2013.01); *H04L 41/00* (2013.01); *H04L 41/0627* (2013.01); *H04L 41/0816* (2013.01); *H04L 43/0888* (2013.01); *H04L 69/22* (2013.01); *G06F 2213/0026* (2013.01); *H04L 67/02* (2013.01); *H04L 67/12* (2013.01); *H04L 67/52* (2022.05)

(58) Field of Classification Search
CPC ............ G06F 13/4226; H04L 41/0627; H04L 41/0816; H04L 69/22
See application file for complete search history.

(56) References Cited

U.S. PATENT DOCUMENTS

| | | | |
|---|---|---|---|
| 2012/0079156 A1* | 3/2012 | Safranek | G06F 12/0835 710/305 |
| 2013/0294458 A1* | 11/2013 | Yamaguchi | H04L 47/30 370/412 |
| 2014/0006670 A1 | 1/2014 | Wagh | |

(Continued)

OTHER PUBLICATIONS

European Patent Office, European Search Report dated Nov. 12, 2020 in European patent application No. 20179625.7, 9 pages total.

(Continued)

*Primary Examiner* — Zachary K Huson
(74) *Attorney, Agent, or Firm* — Trop, Pruner & Hu, P.C.

(57) ABSTRACT

In one embodiment, an apparatus includes: a transmitter to send a first plurality of flits to a second device coupled to the apparatus via a link; and a control circuit coupled to the transmitter to change a configuration of the link from a flit-based encoding to a packet-based encoding. In response to the configuration change, the transmitter is to send a first plurality of packets to the second device via the link. Other embodiments are described and claimed.

20 Claims, 9 Drawing Sheets

(51) Int. Cl.
*H04L 67/02* (2022.01)
*H04L 67/52* (2022.01)

(56) References Cited

U.S. PATENT DOCUMENTS

| | | |
|---|---|---|
| 2014/0112339 A1 | 4/2014 | Safranek et al. |
| 2015/0333956 A1* | 11/2015 | James .................... H04L 67/10 |
| | | 709/220 |
| 2016/0173398 A1* | 6/2016 | Reinig .................... G06F 13/28 |
| | | 370/235 |
| 2016/0283399 A1 | 9/2016 | Das Sharma |
| 2018/0210845 A1* | 7/2018 | Jafri .................... G06F 13/1642 |
| 2019/0305888 A1 | 10/2019 | Das Sharma |
| 2020/0012555 A1 | 1/2020 | Das Sharma |
| 2020/0192853 A1* | 6/2020 | Caruk ................. G06F 13/1689 |

OTHER PUBLICATIONS

The University of New Hampshire Interoperability Laboratory, "Introduction to PCIe Express," 2011, 20 pages total.
Intel, "AN 835: PAM4 Signaling Fundamentals," Mar. 12, 2019, 52 pages total.
European Patent Office, Communication Pursuant to Article 94(3) EPC dated Apr. 29, 2022 in European Patent Application No. 20179625.7 (5 pages).

\* cited by examiner

LINK LAYER COMMUNICATION BY MULTIPLE LINK LAYER ENCODINGS FOR COMPUTER BUSES

This application claims priority to U.S. Provisional Patent Application No. 62/897,546, filed on Sep. 9, 2019, in the name of Debendra Das Sharma, entitled "Link Layer Communication By Multiple Link Layer Encodings For Computer Buses," the disclosure of which is hereby incorporated by reference.

TECHNICAL FIELD

Various embodiments generally may relate to the field of communication and computing, and in particular, may relate to a computer bus and devices coupled by a computer bus.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A computer system, or a platform, may include many components, such as a host including a central processing unit (CPU), memory, chipsets, and/or many other devices coupled together by a computer bus. A computer bus is a communication system that may transfer data between devices or components inside a computer, or between computers. A computing system or a platform may use various devices coupled to a computer bus extensively. A computer bus may include related hardware components (wire, optical fiber, etc.) and software, including communication protocols. There may be many kinds of computer bus, such as serial buses or parallel buses.

DETAILED DESCRIPTION

Figure 1:
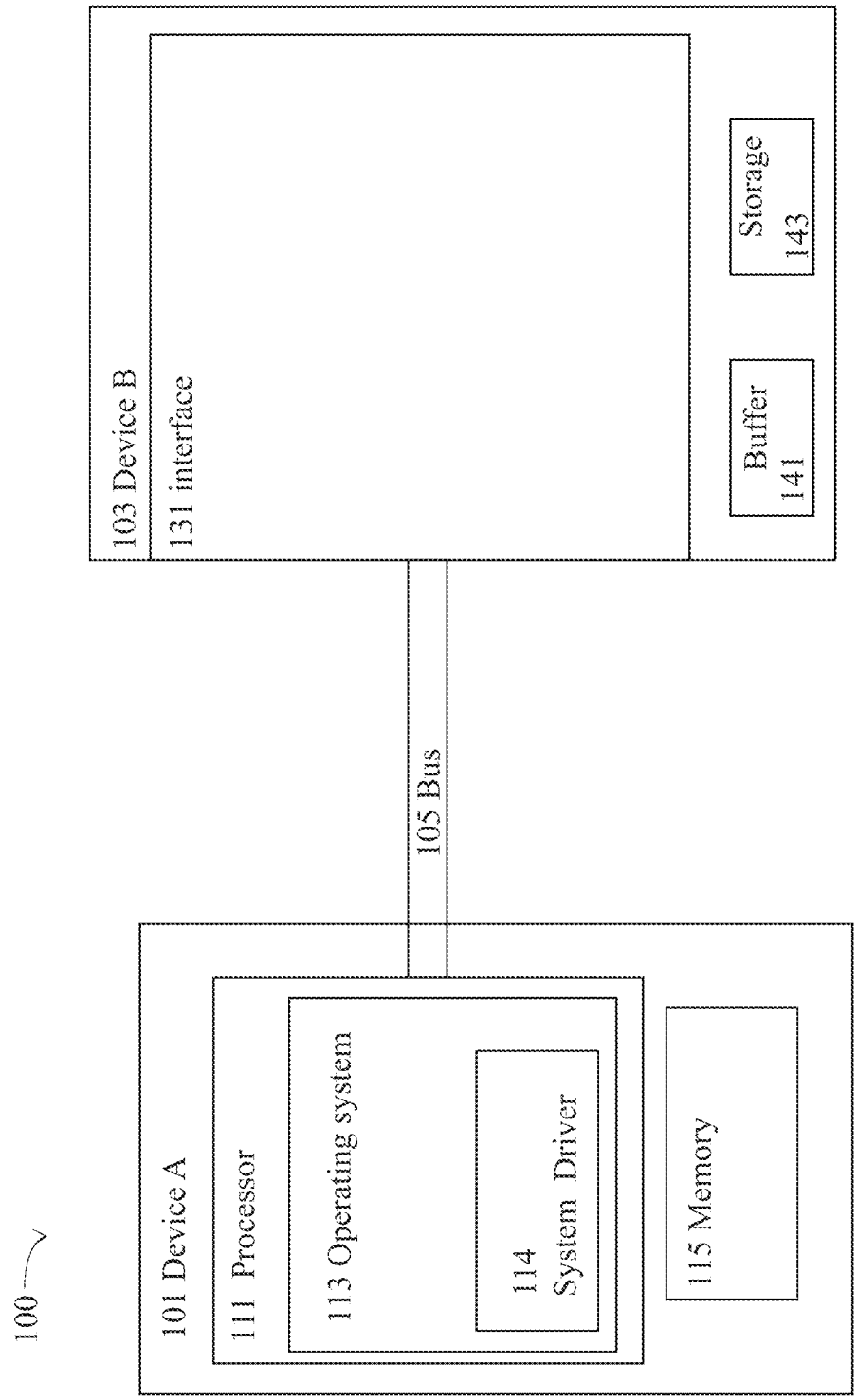
FIG. 1 illustrates an example apparatus including a device coupled to another device by a computer bus, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

A computing system or a platform may use various devices coupled to a computer bus extensively. A computer bus may include related hardware components (wire, optical fiber, etc.) and software, including communication protocols. A peripheral component interconnect (PCI) bus or a PCI Express (PCIe, PCI-E) may be a computer bus based on a specification that provides a mechanism for system software, or a system driver, to perform various operations related to the configuration of a device coupled to the PCI bus or the PCIe bus. Devices, or components coupled to a computer bus may also be referred to as functions. PCIe may operate in consumer, server, and industrial applications, as a motherboard-level interconnect (to link motherboard-mounted peripherals), a passive backplane interconnect, and as an expansion card interface for add-in boards. PCIe devices communicate via a logical connection called an interconnect or link. A link is a point-to-point communication channel between two PCIe ports allowing both of them to send and receive ordinary PCI requests, e.g., configuration, input/output (I/O), or memory read/write, and interrupts. At the physical level, a link may be composed of one or more lanes. Low-speed peripherals, such as an IEEE 802.11 Wi-Fi card, use a single-lane (×1) link, while a graphics adapter typically uses a much wider and faster 16-lane link.

In the description below, a PCI bus or a PCIe bus may be used as an example of a computer bus. Similarly, a PCI device or a PCIe device may be used as an example of a device coupled to a computer bus. Descriptions about a PCIe device may be applicable to any other device coupled to any computer bus.

PCIe Gen 6 will use flit-based encoding for 64.0 giga-transfers per second (GT/s) data rate and above with pulse-amplitude modulation (PAM)-4 encoding. A flit may comprise of one or more Transaction Layer Packets (TLPs), including partial TLP(s). As one example, a flit width may be 256 bytes. A TLP can straddle over multiple flits. Link layer tracking is based on flits (sequence number, acknowledge/no acknowledge (Ack/Nak), and retry). In contrast, the packet-based encoding of 8b/10b and 128b/130b encoding uses sequence number, Ack/Nak and conducted link layer retry on a per-TLP basis. When data rate is switched from one that uses flit-based transfers (e.g., 64.0 GT/s) to one that uses 8b/10b or 128b/130b encoding, the committed sequence number of a flit may be half-way through a TLP. The sequence numbers may mean different things in the flit-based encoding vs 8b/10b or 128b/130b encoding. The link can dynamically switch between different data rates. Embodiments herein provide mechanisms for the link to work seamlessly across different data rates even with the different approaches to link layer sequencing.

Embodiments herein perform a Data Link Layer Packet (DLLP) handshake when the link transitions from a data rate using flit-based encoding to inform the link partner the last sequence number in the prior encoding that was received. An alternative is to always stay in the flit-based encoding mechanism even in 8b/10b and 128b/130b encoding with some enhancements to the 8b/10b or 128b/130b encoding. Embodiments herein may preserve the existing PCIe link layer retry mechanism across different data rates without having to take the link down.

Various operations will be described as multiple discrete operations, in turn, in a manner that is most helpful in understanding the illustrative embodiments; however, the order of description should not be construed as to imply that these operations are necessarily order dependent. In particular, these operations may not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like). As used herein, the terms "instantiate," "instantiation," and the like may refer to the creation of an instance, and an "instance" may refer to a concrete occurrence of an object, which may occur, for example, during execution of program code.

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. As used herein, the term "user equipment" or "UE" may refer to a device, such as a computer device, with radio communication capabilities and may describe a remote user of network resources in a communications network. The term "user equipment" or "UE" may be considered synonymous to, and may hereafter be occasionally referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc.

Examples of "computer devices", "computer systems", "UEs", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/ engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. The term "RSU" may refer to any transportation infrastructure entity implemented in an gNB/eNB or a stationary (or relatively stationary) UE. An RSU implemented in a UE may be referred to as a "UE-type RSU" and an RSU implemented in an eNB may be referred to as an "eNB-type RSU." As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

FIG. 1 illustrates an example apparatus 100 including a device 101, e.g., a host, coupled to another device 103 by a computer bus 105, in accordance with various embodiments. For clarity, features of the apparatus 100, the device 101, the device 103, and the computer bus 105, are described below as an example. It is to be understood that there may be more or fewer components included in the apparatus 100, the device 101, the device 103, and the computer bus 105. Further, it is to be understood that one or more of the devices and components within the apparatus 100 may include additional and/or varying features from the description below, and may include any device that one having ordinary skill in the art would consider and/or refer to as a host, a device, and a computer bus. In some embodiments, the computer bus 105 may be a PCI or PCIe bus.

In embodiments, the device 101 may include the processor 111 and a memory 115. An operating system 113 may operate on the processor 111, and may include a system driver 114. The device 103 may be coupled to the processor 101 by the computer bus 105. The device 103 may include an interface 131 coupled to the computer bus 105, a buffer 141, and a storage 143. The interface 131 may include one or more registers, such as a capability header register, an authentication header register, an authentication capability register, an authentication status register, an authentication control register, a write data mailbox register, a read data mailbox register, or some other registers.

In embodiments, the apparatus 100 may be any computing system or platform, for example, a laptop computer, an ultra-laptop computer, a tablet, a touch pad, a portable computer, a handheld computer, a wearable device, a palmtop computer, a personal digital assistant (PDA), an e-reader, a cellular telephone, a combination cellular telephone/PDA, a mobile smart device (e.g., a smart phone, a smart tablet, etc.), a mobile internet device (MID), a mobile messaging device, a mobile data communication device, a mobile media playing device, a camera, a mobile gaming console, etc. In embodiments, the apparatus 100 may also be a non-mobile device that may include, but is not to be limited to, for example, a personal computer (PC), a television, a smart television, a data communication device, a media playing device, a gaming console, a gateway, an Internet of Things (JOT) device, etc. The apparatus 100 may include controllers (or processors) and other components that execute software and/or control hardware to execute local programs or consume services provided by external service providers over a network. For example, the apparatus 100 may include one or more software clients or applications that run locally and/or utilize or access web-based services (e.g., online stores or services, social networking services, etc.). The apparatus 100 may also, or instead, include a web interface running in a browser from which the electronic apparatus can access such web-based services. The apparatus 100 may also include storage devices to store logic and data associated with the programs and services used by the apparatus 100.

In embodiments, the processor 111 may be a central processing unit (CPU). In some embodiments, the processor 111 may be a programmable device that may execute a program, e.g., the system driver 114. In embodiments, the processor 111 may be a microcontroller, a 16-bit processor, a 32-bit processor, a 64-bit processor, a single core processor, a multi-core processor, a digital signal processor, an embedded processor, or any other processor.

In embodiments, the operating system 113 may be any system software that manages hardware or software resources for the apparatus 100, and may provide services to applications, e.g., the system driver 114. The operating system 113 may be Windows®, Android OS, iOS, Linux, a real-time operating system (RTOS), an automotive infotainment operating system, among others. For example, the operating system 113 may be a real-time operating system such as VxWorks, PikeOS, eCos, QNX, MontaVista Linux, RTLinux, Windows CE, or other operating system.

In embodiments, the computer bus 105 may be an external computer bus, an internal computer bus, a serial computer bus, or a parallel computer bus. For example, the computer bus 105 may be a PCI bus, a PCI Extended bus (PCI-X), a PCI express bus, a universal serial bus (USB), a parallel advanced technology attachment (PATA) bus, a serial ATA (SATA) bus, an inter-integrated circuit (I²C) bus, an IEEE 1394 interface (FireWire) bus, a small computer system interface (SCSI) bus, a scalable coherent interface (SCI) bus, or other computer bus.

In embodiments, the device 103 may be any piece of computer hardware. For example, the device 103 may be a network interface card, an audio card, a video controller, an Ethernet controller, a webcam, mouse, a Bluetooth controller, a PCI to ISA bridge, a GUI Accelerator, an ATM Controller, a memory controller, an accelerator (GPUI, FPGA etc), another CPU, a multimedia card, a SCSI controller, a multimedia device, a MPEG-II Video Decoder, or any input/output device. In embodiments, the device 103 may be a PCI device, which may be plugged directly into a PCI slot on a computer's motherboard. In some other embodiments, the device 103 may be coupled to the processor 111 by a different computer bus.

Figure 2:
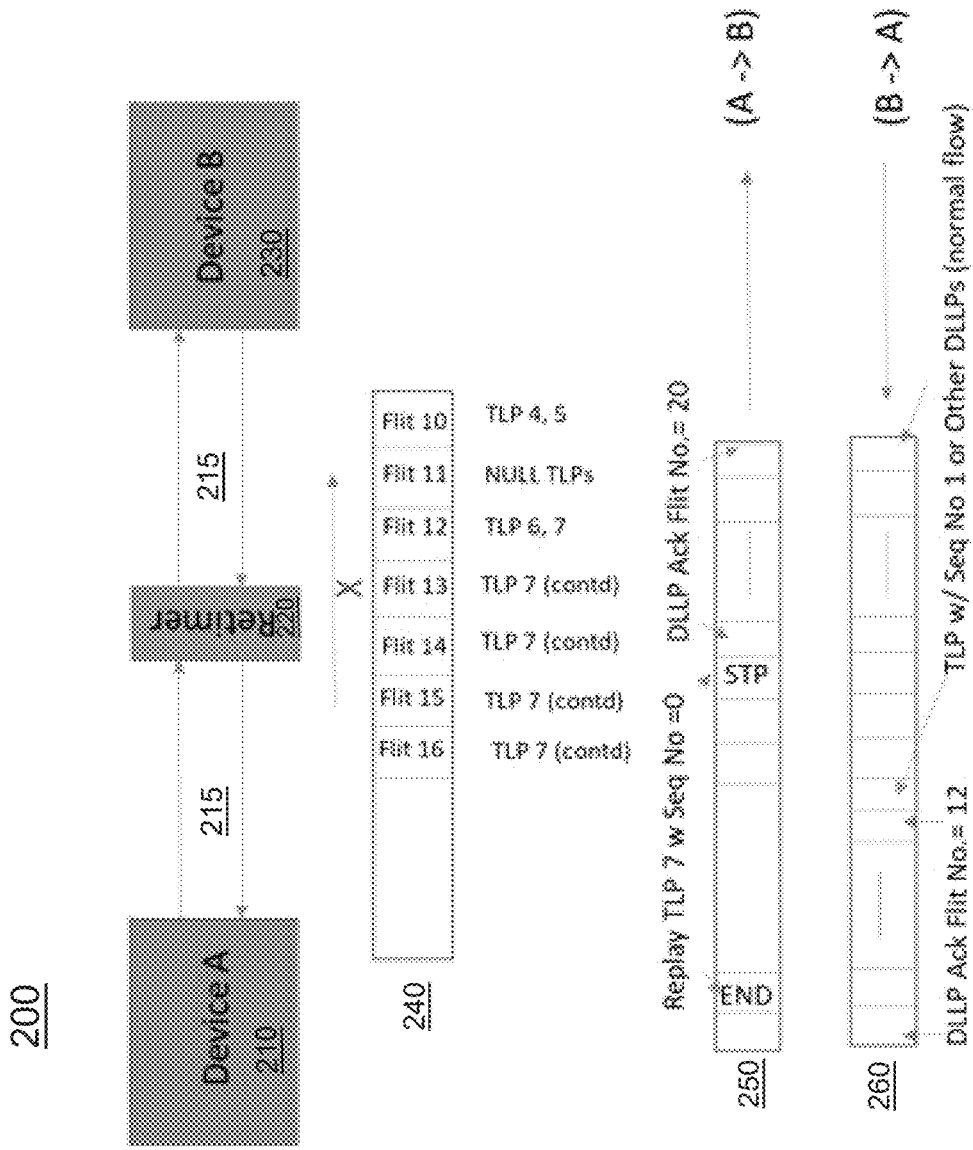
FIG. 2 is a block diagram of a system in accordance with an embodiment.

FIG. 2 illustrates an example system architecture for link layer communication by multiple link layer encodings for a computer bus, in accordance with various embodiments. As shown in FIG. 2, system 200 includes multiple devices coupled together via an interconnect. More specifically, a first device 210 (device A) couples to a second device 230 (device B) via an interconnect 215. Devices 210, 230 may take many forms in different embodiments. As examples, one or more of these devices may be processing devices such as a CPU, a SoC or other type of processing circuit such as any other type of integrated circuit (IC) having processing capabilities. Similarly, second device 230 also may be a CPU, SoC, memory device or other IC. In yet other cases, devices 210, 230 may be separate computing systems coupled together via interconnect 215.

In an embodiment, interconnect 215 may be used to communicate using one or more communication protocols. As one example, interconnect 215 may communicate information between these devices using a PCIe communication protocol. As further shown in FIG. 2, an optional retimer 220 may couple between the devices in certain circumstances.

As further illustrated in FIG. 2, first device 210 is communicating with second device 230 via a flit-based protocol. More specifically, first device 210 may communicate flits at a high speed according to a PCIe communication protocol (e.g., PCIe GEN 6 communicating at 64 GT/s). As seen in data stream 240, these flits may carry TLPs such that each flit may include: one or more complete TLPs; a partial TLP, null TLPs, or combinations thereof. In different embodiments, flit width may vary; however for purposes of discussion, assume a flit width of 256 bytes. According to a PCIe communication protocol, transaction layer packets themselves may be formed of a header and other overhead information and possibly a data payload. As such, TLPs have a variable size, which may vary between 3 double words (DWs) and 1 k double words.

Thus as illustrated, each flit, which is of a fixed width, may carry one or more TLP's or portions thereof. Assume that during communication of TLP 7 (and more specifically during flit 13) an error occurs. Based at least in part on this error, a link speed change may occur in which the link changes from flit-based communication to packet-based communication. For example, communication may change from flit-based encoding at 64.0 GT/s to 8b/10b encoding at 2.5 GT/s. As a result of this link speed change, data link layer packets (DLLPs) may be communicated between the devices to identify a last successful flit that was sent and received in both directions.

Thus as illustrated in datastream 250, which is sent from first device 210 to second device 230, the DLLP acknowledgment of flits is sent to indicate a last successfully received flit 20 from second device 230. As further illustrated in FIG. 2, in the direction from second device 230 to first device 210, the DLLP acknowledgment of flits is sent to indicate a last successfully received flit 12 from first device 210.

After this acknowledgment protocol of DLLP's, a replay of the failed TLP, namely TLP 7, may begin using a start transaction layer packet (STP) special symbol to a TLP that begins with a sequence number of 0 to identify the replaying of the beginning of TLP 7. After this replay, continued communication of TLP 7 may proceed until it is completed with an end frame indicator.

Note that a link re-configuration between a flit-based protocol and packet-based protocol may occur as a result of one or more errors. It is also possible for such change to occur for another reason, such as enabling communication of certain data types or for other reasons such as working around any issues that may show up later in the field.

Thus in this example of FIG. 2, the link changes data rate from 64.0 GT/s to 2.5 GT/s with an error in flit #13 from Device A to Device B. Flit 13 happens to be in the midst of TLP 7. There are no non-NULL TLPs from Device B to A outstanding to be ack'ed when the link changed the data rate. After the link goes to L0 at 2.5 GT/s, each device sends a DLLP with the sequence number of the latest flit it successfully received. Since B received up to flit 12, Device A starts to retransmit TLP 7 with a sequence number 0, signifying it is replaying from its replay buffer. Device B knows to ignore the first few DWs from A of TLP 7 since it had already ack'ed the partial TLP in flit 12. An optional enhancement (which goes with sequence number 0) may be for Device A to indicate through a special TLP prefix on how many double words (DWs) Device B should ignore from the TLP 7. When Device B starts sending its first TLP, it does so with sequence number 1. Note that this difference in sequence number (0 vs 1) is used as a helpful debug mechanism.

As shown in FIG. 2, the last good flit received and Ack'ed by Device B was flit 12; TLP7 would have continued past flit 16 from Device A when link enters recovery and downshifts speed to Gen 1 data rate. For simplicity, it is assumed that B->A has no TLPs in flight and the flit with the last TLP from Device A(20) was Ack'ed (and received) back to Device A.

When moving from flit-encoding to 8b/10b or 128b/130b, a special DLLP with acknowledgement flit numbers may be sent first. Each device continues sending this DLLP till its receivers receives a similar DLLP without any error. After that it switches over to replaying TLPs, if needed and/or sending TLPs/other DLLPs—e.g., link is back to normal.

Figure 3:
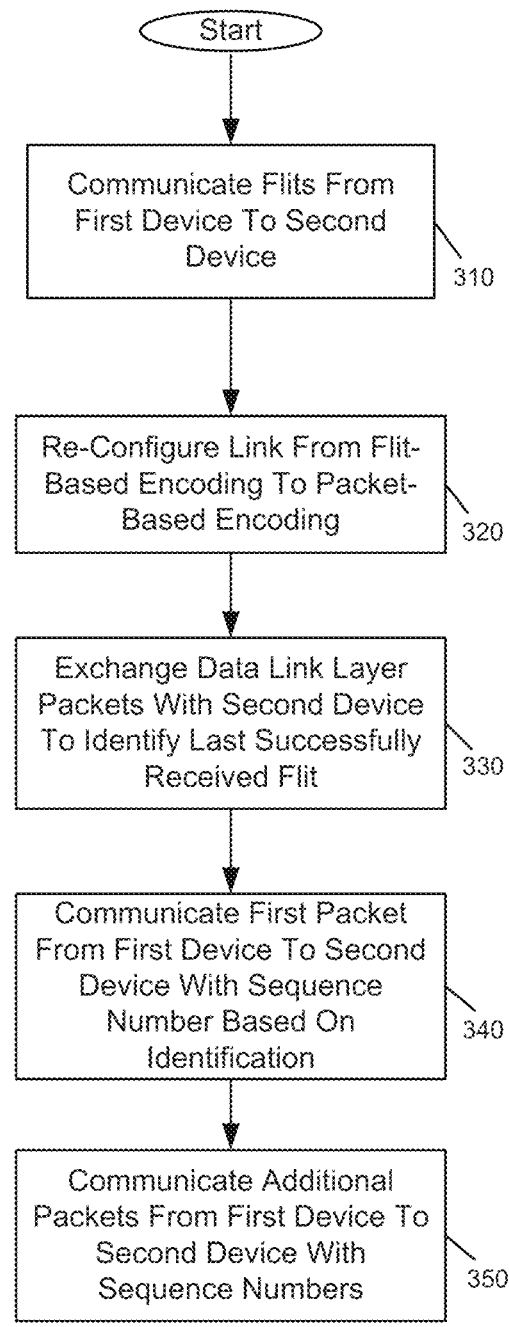
FIG. 3 is a flow diagram of a method in accordance with one embodiment.

Referring now to FIG. 3, shown is a flow diagram of a method in accordance with one embodiment. As shown in FIG. 3, method 300 may be used to re-configure a link from a flit-based protocol to a packet-based protocol. In an embodiment, method 300 may be performed by control circuitry of one or more link partners to a link. As such, method 300 may be performed by hardware circuitry, firmware, software, and/or combinations thereof. As illustrated, method 300 begins by communicating flits from a first device to a second device (block 310). Such flit communication may occur when the link that couples these devices together is configured for flit-based encoding. Note that individual flits that are sent may be of one or more TLP's.

Next at block 320 the link may be re-configured from flit-based encoding to packet-based encoding. As discussed above, such re-configuration may occur for a number of reasons. Note that to perform this link re-configuration, the link may go through a recovery state, before it re-enters into an active state. In an embodiment, such link re-configuration may include controlling transaction layer and link layer circuitry to operate according to a packet-based encoding, link speed changes and so forth. To this end, control circuitry may cause tracking circuitry such as counters to be appropriately controlled to maintain sequence numbers for transmitted and received packets. Furthermore, such link re-configuration may cause certain data link layer packets to be prepared for transmission. Clock circuitry also may be re-configured to enable communication at different data rates.

Next as shown in FIG. 3, at block 330 data link layer packets may be exchanged between the devices. More specifically, for incoming communications to the first device, a data link layer packet may be prepared and sent to identify a last successfully received flit. As such, this data link layer packet may be used by the link partner to identify an appropriate starting point for communication of packet-based information. And the first device may receive a similar data link layer packet to indicate the last successfully received flit within the second device. This information may be used to begin packet-based communication with an appropriate packet. Note that each side may send the data link layer packets with acknowledgment flit numbers until their corresponding receivers receive a similar data link layer packet from the other side without error. After successful receipt on both sides, packet-based encoding and communication may proceed.

Specifically as shown in FIG. 3, at block 340 the first device may communicate a first packet to the second device with a sequence number that is based on the identification of the last successfully received flit. If the last successful flit that was communicated was in the middle of a TLP, the first device may send a replay of that TLP from its replay buffer. Furthermore, this TLP may be sent with a sequence number of zero to indicate this replay of at least part of a prior sent TLP. Otherwise if the last successful flit included a completed TLP, the first device may send a TLP with a sequence number of one to indicate this new data packet.

With further reference to FIG. 3, as illustrated at block 350, additional packets may be sent with appropriate sequence numbers (e.g., incrementing from the first sequence number sent with the first packet). Understand while shown at this high level in the embodiment of FIG. 3, many variations and alternatives are possible.

Figure 4:
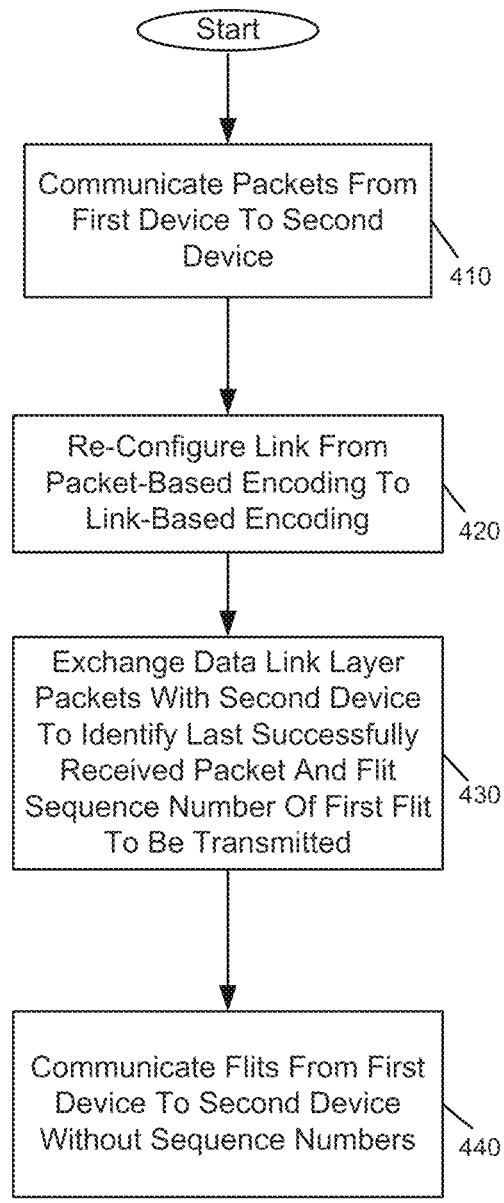
FIG. 4 is a flow diagram of a method in accordance with another embodiment.

Referring now to FIG. 4, shown is a flow diagram of a method in accordance with another embodiment. As shown in FIG. 4, method 400 may be used to re-configure a link from a packet-based protocol to a flit-based protocol. In an embodiment, method 400 may be performed by control circuitry of one or more link partners to a link, as described above. As illustrated, method 400 begins by communicating packets from a first device to a second device (block 410). Next at block 420 the link may be re-configured from packet-based encoding to flit-based encoding. As discussed above, such re-configuration may occur for a number of reasons and may include different operations.

Next as shown in FIG. 4, at block 430 data link layer packets may be exchanged between the devices. More specifically, for incoming communications to the first device, a data link layer packet may be prepared and sent to identify a last successfully received packet. As such, this data link layer packet may be used by the link partner to identify an appropriate starting point for communication of flit-based information. In addition the data link layer packet may further include a flit sequence number for a first flit of the flit-based encoding to be transmitted from the first device to the second device. With this information, the second device may appropriately set a tracker such as a counter to begin tracking incoming flits, since such flits may be sent with implicit flit sequence numbers (meaning without explicit sequence numbers). This is the case since the receiver can track flit sequence numbers using the tracker. And the first device may receive a similar data link layer packet to indicate the last successfully received packet within the second device and a flit sequence number of its first flit to be transmitted.

Still with reference to FIG. 4, at block 440 the first device may communicate flits to the second device without sequence numbers, given the prior sending of the flit sequence number of the first flit within the data link layer packet.

Figure 5:
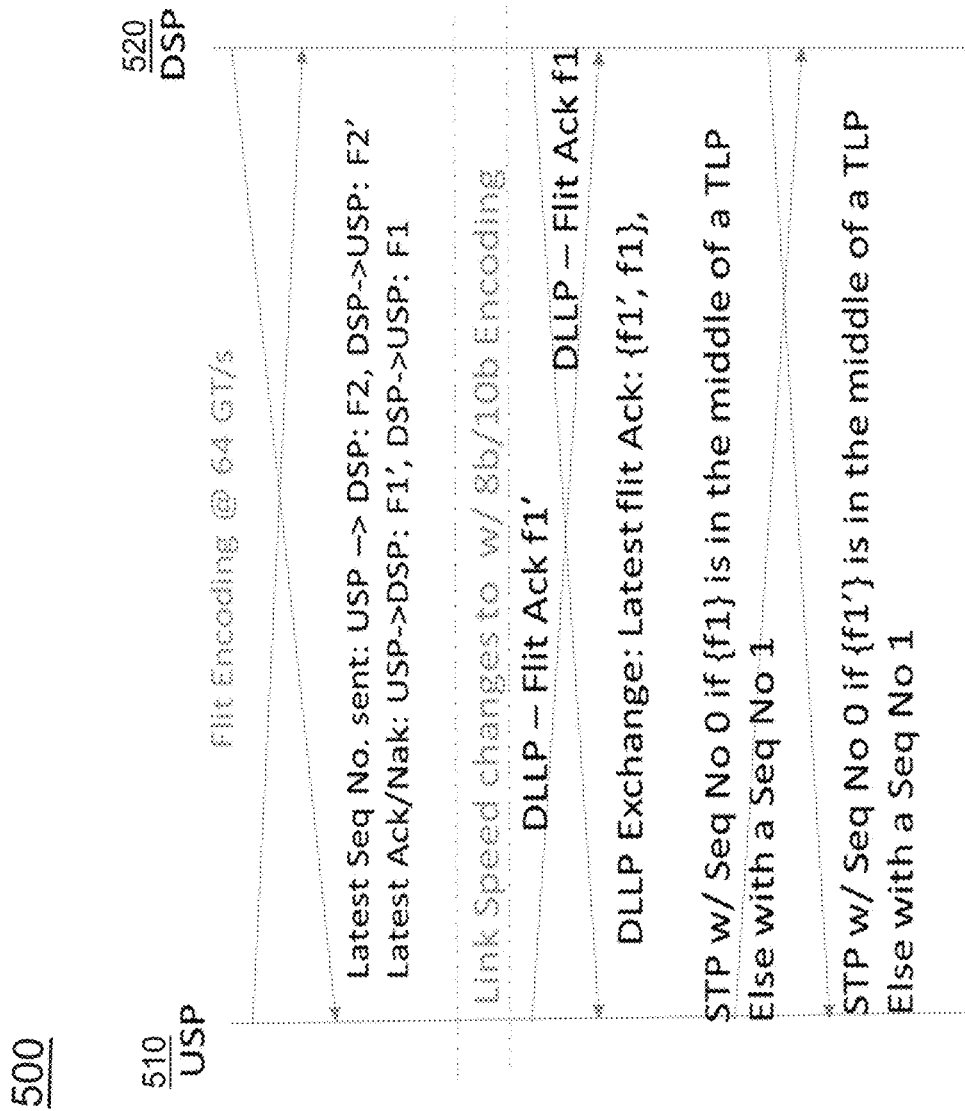
FIGS. 5 and 6 illustrate example sequence diagrams for data rate change of a computer bus between non-flit based encoding and flit-based encoding, in accordance with various embodiments.
Figure 6:
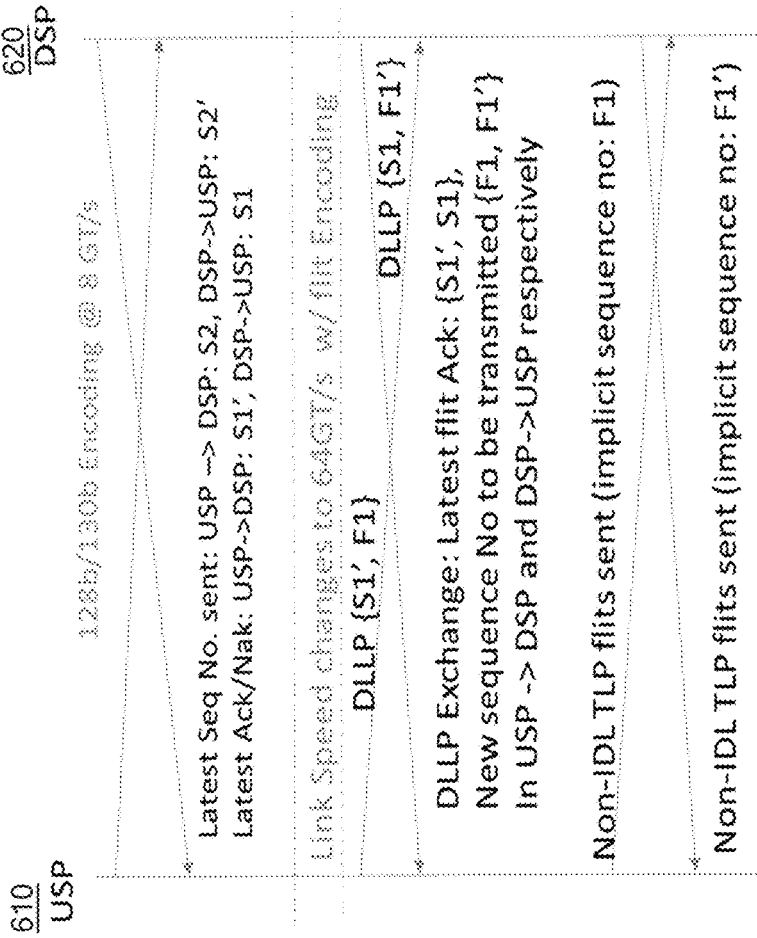

FIGS. 5 and 6 illustrate example sequence diagram for data rate change of a computer bus between non-flit based encoding and flit-based encoding, in accordance with various embodiments.

As illustrated in FIG. 5, a communication diagram 500 illustrates data exchanges between an upstream device (USP) 510 and a downstream device (DSP) 520. As seen, initial communications are at high speed with flit encoding (e.g., at 64 GT/s). During these communications of flits, the upstream device most recently sent a flit having a flit sequence number of F2 and the downstream device most recently sent a flit having a flit sequence number of F2'. As discussed herein understand that these flits may be sent with implicit flit sequence numbers. In turn, Ack/Nak messages may be sent via data link layer packets, where the last acknowledged flits in the upstream and downstream directions are respectively F1' and F1.

As further shown in FIG. 5, thereafter the link speed changes to a lower speed and further changes to packet-based encoding, namely 8b/10b encoding. Prior to sending any actual data, both sides exchange data link layer packets that acknowledge the last successfully received flit (as shown F1' in upstream device 510 and F1 in downstream device 520). After both sides successfully receive these packets, packet-based communications may proceed, beginning with a TLP having a start transaction layer packet (STP) special symbol that selectively communicates one of two predetermined sequence numbers (0 or 1), depending upon whether the last successfully received flit was in the middle of a TLP. Specifically, the STP is sent with a sequence number of 0 if the last successfully received flit was in the middle of a TLP; otherwise it is sent with a sequence number of 1.

FIG. 5 demonstrates an embodiment where both sides exchange the flit sequence number prior to resuming normal TLP/DLLP traffic. The algorithm is further demonstrated through a flowchart in FIG. 7. The transition from a non-flit-based encoding to a flit-based encoding is similar. However, the current embodiment does not deal with a partial flit (or a partial TLP), since an entire TLP is Ack'ed. The initial DLLP exchange conveys information about the latest TLP sequence number that was successfully received as well as the flit sequence number to be used as a transmitter (since the flit sequence number is implicit).

An alternate mechanism would be to stick to the flit-based encoding even when the data rate changes to one that uses the 8b/10b or 128b/130b encoding. In this approach, each flit can be treated as a "TLP" (even with the DLLP payload) with the corresponding "STP"/"END" symbols.

As illustrated in FIG. 6, a communication diagram 600 illustrates data exchanges between an USP 610 and a DSP 620. As seen, initial communications are at low speed with packet-based encoding (e.g., 128b/130b at 8 GT/s). During these communications of flits, the upstream device most recently sent a TLP having a TLP sequence number of S2 and the downstream device most recently sent a TLP having a TLP sequence number of S2'. In turn, Ack/Nak messages may be sent via data link layer packets, where the last acknowledged TLPs in the upstream and downstream directions are respectively S1' and S1.

As further shown in FIG. 6, thereafter the link speed changes to a higher speed and further changes to flit-based encoding. Prior to sending any actual data, both sides exchange data link layer packets that acknowledge the last successfully received TLP (as shown S1' in upstream device 610 and S1 in downstream device S1). Note that in this data link layer packet exchange, in addition to providing an acknowledgement of the last successfully received flit, a new flit sequence number for the first flit of flit-based encoding to be transmitted also is sent. As such, flit-based communications may then proceed with both sides sending non-idle TLP flits having implicit sequence numbers, beginning with the flit sequence number sent in the data link layer packets. In this way, each side, via an internal tracker may keep track of the sequence numbers of incoming flits, even where these flits do not include explicit flit sequence numbers.

Figure 7:
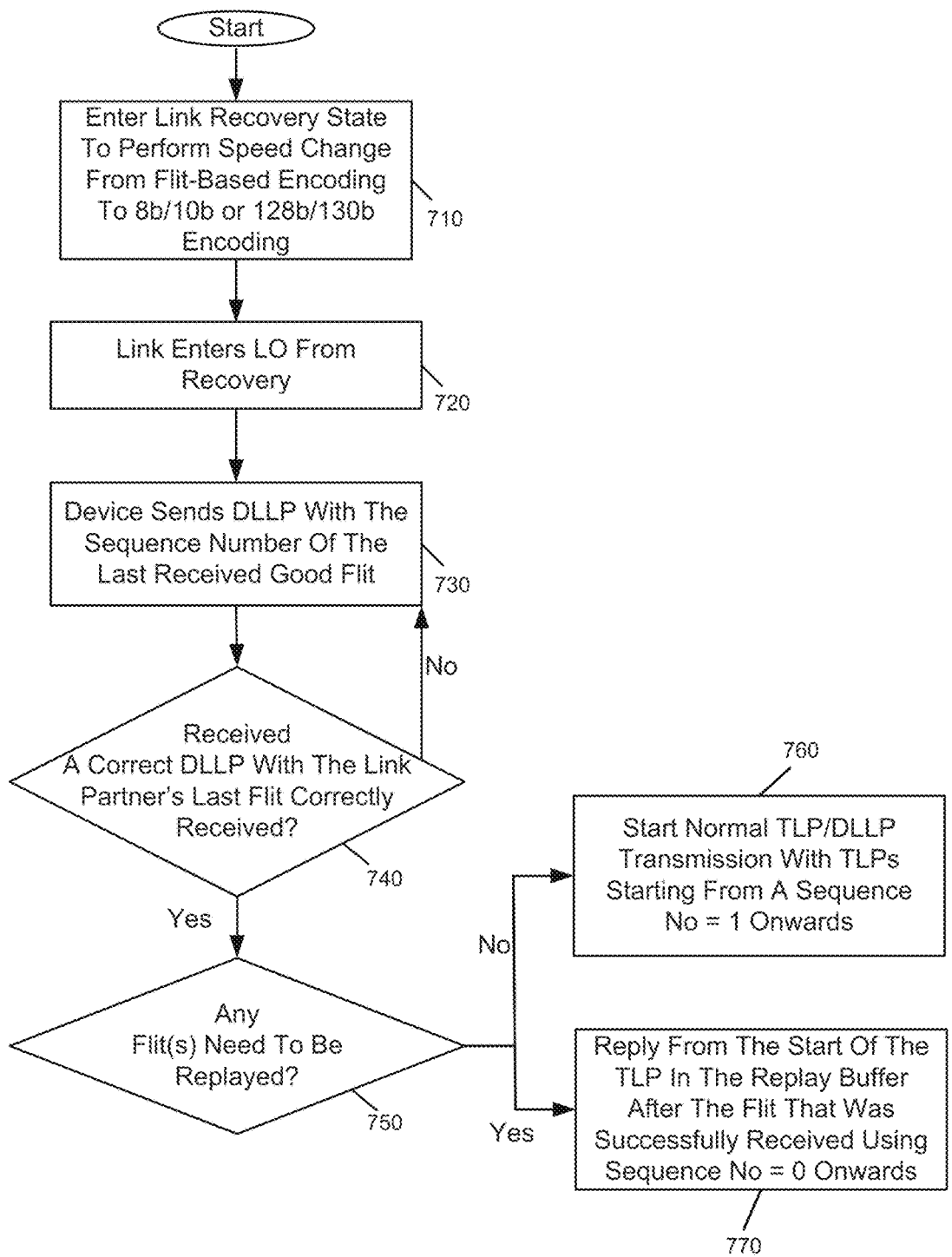
FIG. 7 is an illustration of an example flowchart for handling link layer communication by multiple link layer encodings for a computer bus in accordance with one embodiment.

FIG. 7 illustrates an example flowchart for handling link layer communication by multiple link layer encodings for a computer bus, in accordance with various embodiments. In the flowchart of FIG. 7, speed for a link of a computer bus is changed from a flit-based encoding to one without flit-based encoding.

As illustrated, method 700 begins by causing a link to enter into a recovery state to perform a speed change (block 710). As part of this speed change, encoding mechanisms may change, namely from a flit-based encoding to a packet-based encoding (e.g., 8b/10b or 128b/130b). Thereafter, the link enters into the active state (L0) from the recovery state (block 720). Then at block 730 each device coupled to the link may send data link layer packets with a sequence number of the last received good flit that it received from the link partner. Understand that this DLLP exchange may occur in both directions.

Thus as illustrated further in FIG. 7, at diamond 740 the device may determine whether it received a correct data link layer packet from the link partner with an indication of the last correctly received flit that that device received.

If so, control passes to diamond 750 to determine whether any flits need to be replayed from a replay buffer of the device. This determination may be based upon information in the received DLLP. If no replay is needed, control passes to block 760 where normal TLP/DLLP transmissions may begin by sending packets beginning with a packet sequence number of one to indicate that no replay is occurring. Otherwise control passes to block 770 where TLP/DLLP transmissions may begin by replaying a packet from a replay buffer with a packet sequence number of zero to indicate the replay. Understand while shown at this high level in the embodiment of FIG. 7, many variations and alternatives are possible.

Figure 8:
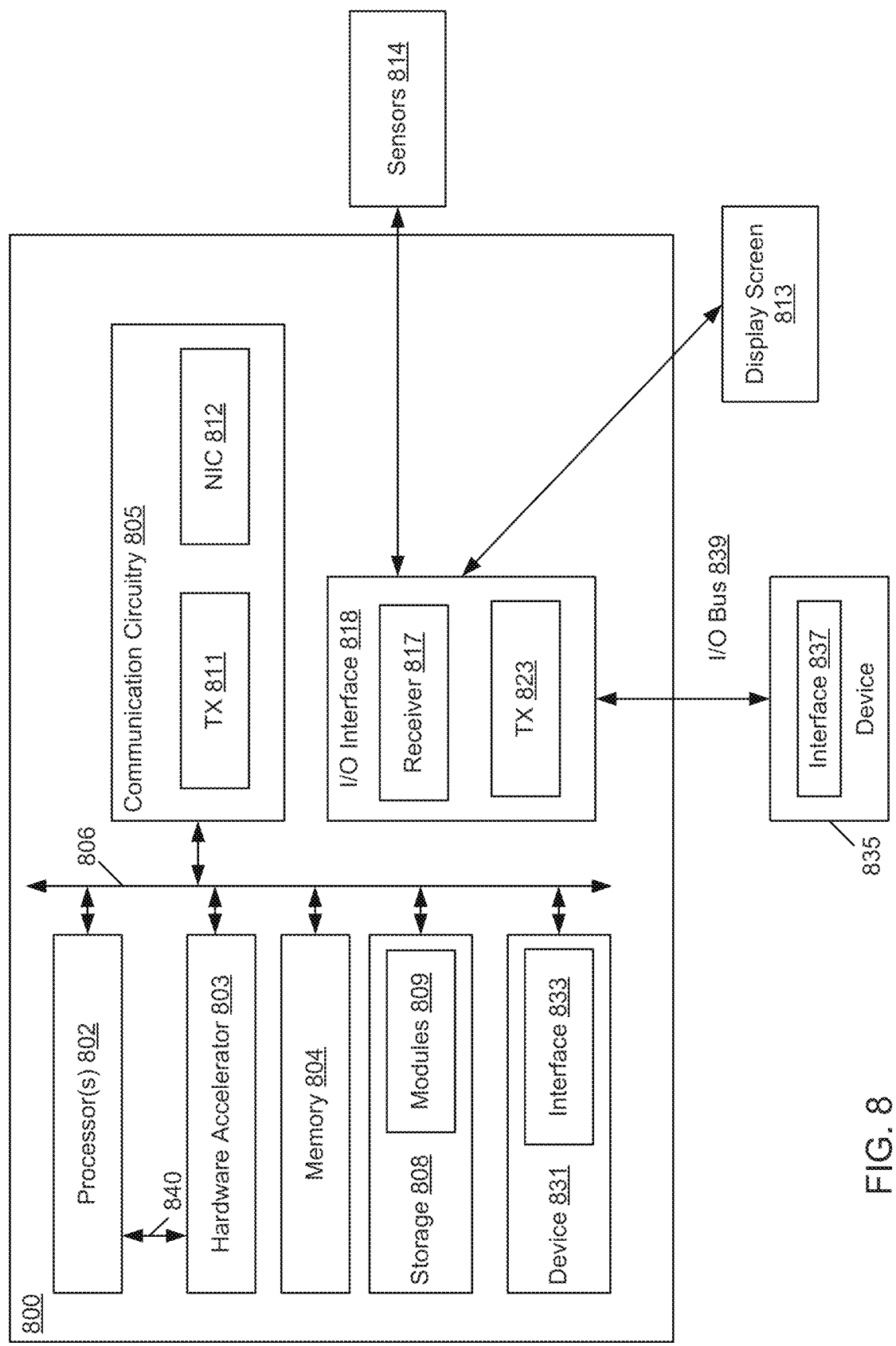
FIG. 8 illustrates an example device suitable for use to practice various aspects of the present disclosure, in accordance with various embodiments.

FIG. 8 illustrates an example device suitable for use to practice various aspects of the present disclosure, in accordance with various embodiments. The device 800 may be used to implement functions of the apparatus 800. As shown, the device 800 may include one or more processors 802, each having one or more processor cores, or and optionally, a hardware accelerator 803 (which may be an ASIC or a FPGA). In alternate embodiments, the hardware accelerator 803 may be part of processor 802, or integrated together on a SOC. Additionally, the device 800 may include a memory 804, which may be any one of a number of known persistent storage medium, and a data storage circuitry 808 including modules 809. In addition, the device 800 may include an I/O interface 818, coupled to one or more sensors 814, and a display screen 813.

The I/O interface 818 may include a transmitter 823 and a receiver 817. Furthermore, the device 800 may include communication circuitry 805 including a transceiver (Tx) 811, and network interface controller (NIC) 812. The elements may be coupled to each other via system bus 806, which may represent one or more buses. In the case of multiple buses, they may be bridged by one or more bus bridges (not shown). A device 831 may be coupled to the system bus 806, and a device 835 may be coupled to a computer bus 839. The device 831 may include an interface 833, and the device 835 may include an interface 837. In embodiments, the computer bus 806 or the computer bus 839 may be an example of the computer bus 105 as shown in FIG. 1.

In embodiments, the processor(s) 802 (also referred to as "processor circuitry 802") may be one or more processing elements configured to perform basic arithmetical, logical, and input/output operations by carrying out instructions. Processor circuitry 802 may be implemented as a standalone system/device/package or as part of an existing system/device/package. The processor circuitry 802 may be one or more microprocessors, one or more single-core processors, one or more multi-core processors, one or more multi-threaded processors, one or more GPUs, one or more ultra-low voltage processors, one or more embedded processors, one or more DSPs, one or more FPDs (hardware accelerators) such as FPGAs, structured ASICs, programmable SoCs (PSoCs), etc., and/or other processor or processing/controlling circuit. The processor circuitry 802 may be a part of a SoC in which the processor circuitry 802 and other components discussed herein are formed into a single IC or a single package. As examples, the processor circuitry 802 may include one or more Intel Pentium®, Core®, Xeon®, Atom®, or Core M® processor(s); Advanced Micro Devices (AMD) Accelerated Processing Units (APUs), Epyc®, or Ryzen® processors; Apple Inc. A series, S series, W series, etc. processor(s); Qualcomm Snapdragon® processor(s); Samsung Exynos® processor(s); and/or the like.

In embodiments, the processor circuitry 802 may include a sensor hub, which may act as a coprocessor by processing data obtained from the one or more sensors 814. The sensor hub may include circuitry configured to integrate data obtained from each of the one or more sensors 814 by performing arithmetical, logical, and input/output operations. In embodiments, the sensor hub may capable of timestamping obtained sensor data, providing sensor data to the processor circuitry 802 in response to a query for such data, buffering sensor data, continuously streaming sensor data to the processor circuitry 802 including independent streams for each sensor of the one or more sensors 814, reporting sensor data based upon predefined thresholds or conditions/triggers, and/or other like data processing functions.

In embodiments, the memory 804 (also referred to as "memory circuitry 804" or the like) may be circuitry configured to store data or logic for operating the computer device 800. The memory circuitry 804 may include number of memory devices may be used to provide for a given amount of system memory. As examples, the memory circuitry 804 can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, anti-fuses, etc.) that may be configured in any suitable implementation as are known. In various implementations, individual memory devices may be formed of any number of different package types, such as single die package (SDP), dual die package (DDP) or quad die package, dual inline memory modules (DIMMs) such as microDIMMs or Mini-DIMMs, and/or any other like memory devices. To provide for persistent storage of information such as data, applications, operating systems and so forth, the memory circuitry 804 may include one or more mass-storage devices, such as a solid state disk drive (SSDD); flash memory cards, such as SD cards, microSD cards, xD picture cards, and the like, and USB flash drives; on-die memory or registers associated with the processor circuitry 802 (for example, in low power implementations); a micro hard disk drive (HDD); three dimensional cross-point (3D XPOINT) memories from Intel® and Micron®, etc.

Where FPDs are used, the processor circuitry 802 and memory circuitry 804 (and/or data storage circuitry 808) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs) that are used by the processor circuitry 802 to implement various logic functions. The memory cells may include any combination of various levels of memory/storage including, but not limited to, EPROM, EEPROM, flash memory, SRAM, anti-fuses, etc.

In embodiments, the data storage circuitry 808 (also referred to as "storage circuitry 808" or the like), with shared or respective controllers, may provide for persistent storage of information such as modules 809, operating systems, etc. The data storage circuitry 808 may be implemented as solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor circuitry 802; hard disk drives (HDDs); micro HDDs; resistance change memories; phase change memories; holographic memories; or chemical memories; among others. As shown, the data storage circuitry 808 is included in the computer device 800; however, in other embodiments, the data storage circuitry 808 may be implemented as one or more devices separated from the other elements of computer device 800.

In some embodiments, the data storage circuitry 808 may include an operating system (OS) (not shown), which may be a general purpose operating system or an operating system specifically written for and tailored to the computer device 800. The OS may include one or more drivers, libraries, and/or application programming interfaces (APIs), which may provide program code and/or software components for modules 809 and/or control system configurations to control and/or obtain/process data from the one or more sensors 814.

The modules 809 may be software modules/components used to perform various functions of the computer device 800 and/or to carry out functions of the example embodiments discussed herein. In embodiments where the processor circuitry 802 and memory circuitry 804 includes hardware accelerators (e.g., FPGA cells, the hardware accelerator 803) as well as processor cores, the hardware accelerators (e.g., the FPGA cells) may be pre-configured (e.g., with appropriate bit streams, logic blocks/fabric, etc.) with the logic to perform some functions of the embodiments herein (in lieu of employment of programming instructions to be executed by the processor core(s)). For example, the modules 809 may comprise logic for the corresponding entities discussed with regard to the display screen 813, the transmitter 823, and the receiver 817.

The components of computer device 800 may communicate with one another over the bus 806. The bus 806 may include any number of technologies, such as a Local Interconnect Network (LIN); industry standard architecture (ISA); extended ISA (EISA); PCI; PCI extended (PCIx); PCIe; an Inter-Integrated Circuit (I2C) bus; a Parallel Small Computer System Interface (SPI) bus; Common Application Programming Interface (CAPI); point to point interfaces; a power bus; a proprietary bus, for example, Intel® Ultra Path Interface (UPI), Intel® Accelerator Link (IAL), or some other proprietary bus used in a SoC based interface; or any number of other technologies. In some embodiments, the bus 806 may be a controller area network (CAN) bus system, a Time-Trigger Protocol (TTP) system, or a FlexRay system, which may allow various devices (e.g., the one or more sensors 814, etc.) to communicate with one another using messages or frames.

The communications circuitry 805 may include circuitry for communicating with a wireless network or wired network. For example, the communication circuitry 805 may include transceiver (Tx) 811 and network interface controller (NIC) 812. Communications circuitry 805 may include one or more processors (e.g., baseband processors, modems, etc.) that are dedicated to a particular wireless communication protocol.

NIC 812 may be included to provide a wired communication link to a network and/or other devices. The wired communication may provide an Ethernet connection, an Ethernet-over-USB, and/or the like, or may be based on other types of networks, such as DeviceNet, ControlNet, Data Highway+, PROFIBUS, or PROFINET, among many others. An additional NIC 812 may be included to allow connect to a second network (not shown) or other devices, for example, a first NIC 812 providing communications to the network over Ethernet, and a second NIC 812 providing communications to other devices over another type of network, such as a personal area network (PAN) including a personal computer (PC) device. In some embodiments, the various components of the device 800, such as the one or more sensors 814, etc. may be connected to the processor(s) 802 via the NIC 812 as discussed above rather than via the I/O circuitry 818 as discussed infra.

The Tx 811 may include one or more radios to wirelessly communicate with a network and/or other devices. The Tx 811 may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of computer device 800. In some embodiments, the various components of the device 800, such as the one or more sensors 814, etc. may be connected to the device 800 via the Tx 811 as discussed above rather than via the I/O circuitry 818 as discussed infra. In one example, the one or more sensors 814 may be coupled with device 800 via a short range communication protocol.

The Tx 811 may include one or multiple radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), and Fifth Generation (5G) New Radio (NR). It can be noted that radios compatible with any number of other fixed, mobile, or satellite communication technologies and standards may be selected. These may include, for example, any Cellular Wide Area radio communication technology, which may include e.g. a 5G communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11 ay, and the like. In addition to the standards listed above, any number of satellite uplink technologies may be used for the uplink transceiver, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated. Implementations, components, and details of the aforementioned protocols may be those known in the art and are omitted herein for the sake of brevity.

The input/output (I/O) interface 818 may include circuitry, such as an external expansion bus (e.g., Universal Serial Bus (USB), FireWire, Thunderbolt, PCI/PCIe/PCIx, etc.), used to connect computer device 800 with external components/devices, such as one or more sensors 814, etc. I/O interface circuitry 818 may include any suitable interface controllers and connectors to interconnect one or more of the processor circuitry 802, memory circuitry 804, data storage circuitry 808, communication circuitry 805, and the other components of computer device 800. The interface controllers may include, but are not limited to, memory controllers, storage controllers (e.g., redundant array of independent disk (RAID) controllers, baseboard management controllers (BMCs), input/output controllers, host controllers, etc. The connectors may include, for example, busses (e.g., bus 806), ports, slots, jumpers, interconnect modules, receptacles, modular connectors, etc. The I/O circuitry 818 may couple the device 800 with the one or more sensors 814, etc. via a wired connection, such as using USB, FireWire, Thunderbolt, RCA, a video graphics array (VGA), a digital visual interface (DVI) and/or mini-DVI, a high-definition multimedia interface (HDMI), an S-Video, and/or the like.

The one or more sensors 814 may be any device configured to detect events or environmental changes, convert the detected events into electrical signals and/or digital data, and transmit/send the signals/data to the computer device 800. Some of the one or more sensors 814 may be sensors used for providing computer-generated sensory inputs. Some of the one or more sensors 814 may be sensors used for motion and/or object detection. Examples of such one or more sensors 814 may include, inter alia, charged-coupled devices (CCD), Complementary metal-oxide-semiconductor (CMOS) active pixel sensors (APS), lens-less image capture devices/cameras, thermographic (infrared) cameras, Light Imaging Detection And Ranging (LIDAR) systems, and/or the like. In some implementations, the one or more sensors 814 may include a lens-less image capture mechanism comprising an array of aperture elements, wherein light passing through the array of aperture elements define the pixels of an image. In embodiments, the motion detection one or more sensors 814 may be coupled with or associated with light generating devices, for example, one or more infrared projectors to project a grid of infrared light onto a scene, where an infrared camera may record reflected infrared light to compute depth information.

Some of the one or more sensors 814 may be used for position and/or orientation detection, ambient/environmental condition detection, and the like. Examples of such one or more sensors 814 may include, inter alia, microelectromechanical systems (MEMS) with piezoelectric, piezoresistive and/or capacitive components, which may be used to determine environmental conditions or location information related to the computer device 800. In embodiments, the MEMS may include 3-axis accelerometers, 3-axis gyroscopes, and/or magnetometers. In some embodiments, the one or more sensors 814 may also include one or more gravimeters, altimeters, barometers, proximity sensors (e.g., infrared radiation detector(s) and the like), depth sensors, ambient light sensors, thermal sensors (thermometers), ultrasonic transceivers, and/or the like.

Each of these elements, e.g., one or more processors 802, the hardware accelerator 803, the memory 804, the data storage circuitry 808 including the modules 809, the input/output interface 818, the one or more sensors 814, the communication circuitry 805 including the Tx 811, the NIC 812, the system bus 806, the computer bus 839, the device 831, the device 835, may perform its conventional functions known in the art. In addition, they may be employed to store and host execution of programming instructions implementing the operations associated with link layer communication by multiple link layer encodings for a computer bus, as described in connection with FIGS. 1-7, and/or other functions that provides the capability of the embodiments described in the current disclosure. The various elements may be implemented by assembler instructions supported by processor(s) 802 or high-level languages, such as, for example, C, that can be compiled into such instructions. Operations associated with the device 800 not implemented in software may be implemented in hardware, e.g., via hardware accelerator 803.

The number, capability and/or capacity of these elements 802-839 may vary, depending on the number of other devices the device 800 is configured to support. Otherwise, the constitutions of elements 802-839 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 9:
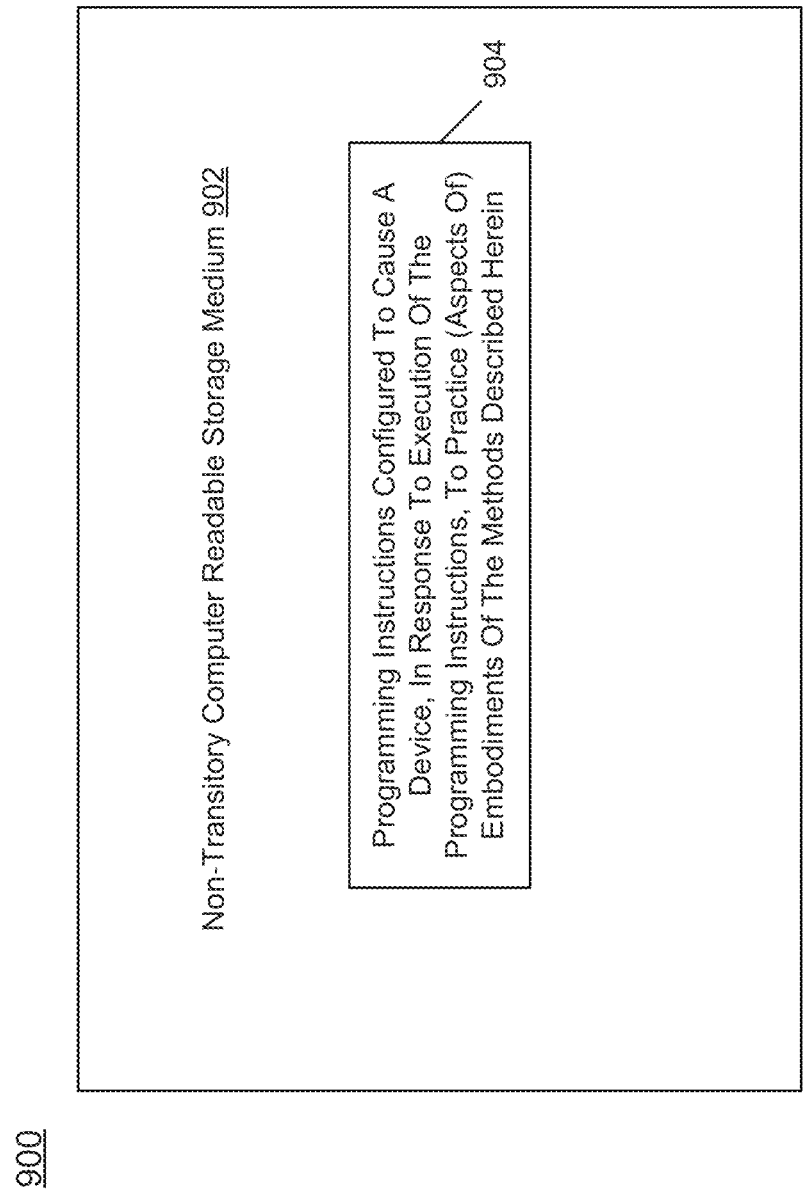
FIG. 9 illustrates a storage medium having instructions for practicing methods described with references to FIGS. 1-7, in accordance with various embodiments

Furthermore, the present disclosure may take the form of a computer program product embodied in any tangible or non-transitory medium of expression having computer-usable program code embodied in the medium. FIG. 9 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 902 may include a number of programming instructions 904. Programming instructions 904 may be configured to enable a device, e.g., device 900, in response to execution of the programming instructions, to perform, e.g., various operations associated with link layer communication by multiple link layer encodings for a computer bus, as shown in FIGS. 1-7.

In alternate embodiments, programming instructions 904 may be disposed on multiple computer-readable non-transitory storage media 902 instead. In alternate embodiments, programming instructions 904 may be disposed on computer-readable transitory storage media 902, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

The following examples pertain to further embodiments.

In one example, an apparatus comprises: a transmitter to send a first plurality of flits to a second device coupled to the apparatus via a link; and a control circuit coupled to the transmitter to change a configuration of the link from a flit-based encoding to a packet-based encoding, where in response to the configuration change, the transmitter is to send a first plurality of packets to the second device via the link.

In an example, the transmitter is to send the first plurality of flits at a first link speed and send the first plurality of packets at a second link speed, the first link speed greater than the second link speed.

In an example, the control circuit is to change the configuration of the link in response to at least one error during communication of the first plurality of flits to the second device.

In an example, the apparatus further comprises a receiver to receive at least one data link layer packet from the second device, the at least one data link layer packet to identify a last flit of the first plurality of flits that the second device correctly received.

In an example, in response to the at least one data link layer packet, the transmitter is to replay at least a portion of a first packet from a replay buffer as a first transaction layer packet having a first predetermined sequence number to identify the replay.

In an example, the transmitter is to include in the first transaction layer packet a prefix to indicate a portion of the first packet for the second device to ignore.

In an example, the receiver is to receive a second packet as a second transaction layer packet from the second device, the second packet having a second predetermined sequence number to indicate a start of the second packet.

In an example, the transmitter is to send a data link layer packet having a first sequence number of a first flit of the first plurality of flits.

In an example, the transmitter is to send the first plurality of flits after the data link layer packet, the first plurality of flits not including sequence numbers.

In another example, a method comprises: communicating, from a first device to a second device via a link, a first plurality of flits; changing a configuration of the link from a flit-based encoding to a packet-based encoding; and communicating, from the first device to the second device via the link, a first plurality of packets.

In an example, the method further comprises changing a link speed of the link when changing the configuration of the link.

In an example, the method further comprises changing the configuration of the link in response to at least one error incurred in communicating the first plurality of flits.

In an example, the method further comprises receiving at least one data link layer packet in the first device from the second device, the at least one data link layer packet to identify a last flit within the first plurality of flits that the second device correctly received.

In an example, the method further comprises in response to the at least one data link layer packet, replaying at least part of a first packet from a replay buffer as a first transaction layer packet having a first predetermined sequence number to identify the replaying.

In an example, the method further comprises receiving a second packet as a second transaction layer packet from the second device, the second packet having a second predetermined sequence number to identify a start of the second packet.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In yet another example, a system includes a first device having: a transmitter to send a first plurality of packets to a second device, each of the first plurality of packets having a packet sequence number; and a control circuit coupled to the transmitter to cause the transmitter to change from encoding according to a packet-based encoding to a flit-based encoding, where in response to the encoding change, the transmitter is to send a first data link layer packet to the second device to indicate a sequence number of a first flit to be sent to the second device with the flit-based encoding. The system further includes a link coupled between the first device and the second device, and the second device coupled to the first device via the link.

In an example, the first device further comprises a receiver to receive a second data link layer packet from the second device, the second data link layer packet to indicate a last packet of the first plurality of packets that the second device correctly received and a sequence number of a first flit to be sent to the first device from the second device with the flit-based encoding.

In an example, the control circuit is, in response to the second data link layer packet, to track sequence numbers of incoming flits from the second device, the incoming flits not including explicit sequence numbers.

In an example, the transmitter is to send the first plurality of packets having xb/yb encoding and send a first plurality of flits having pulse amplitude modulation encoding.

In an example, the transmitter is to send the first plurality of packets at a first link speed and send the plurality of flits at a second link speed, the first link speed less than the second link speed.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a transmitter to send a first plurality of flits to a second device coupled to the apparatus via a link; and
a control circuit coupled to the transmitter to change a configuration of the link from a flit-based encoding to a packet-based encoding, wherein in response to the configuration change, the transmitter is to send a first plurality of packets to the second device via the link.

2. The apparatus of claim 1, wherein the control circuit is to change the configuration of the link in response to at least one error during communication of the first plurality of flits to the second device.

3. The apparatus of claim 1, further comprising a receiver, wherein the receiver is to receive at least one data link layer packet from the second device, the at least one data link layer packet to identify a last flit of the first plurality of flits that the second device correctly received.

4. The apparatus of claim 3, wherein in response to the at least one data link layer packet, the transmitter is to replay at least a portion of a first packet from a replay buffer as a first transaction layer packet having a first predetermined sequence number to identify the replay.

5. The apparatus of claim 4, wherein the transmitter is to include in the first transaction layer packet a prefix to indicate a portion of the first packet for the second device to ignore.

6. The apparatus of claim 4, wherein the receiver is to receive a second packet as a second transaction layer packet from the second device, the second packet having a second predetermined sequence number to indicate a start of the second packet.

7. The apparatus of claim 1, wherein the transmitter is to send a data link layer packet having a first sequence number of a first flit of the first plurality of flits.

8. The apparatus of claim 7, wherein the transmitter is to send the first plurality of flits after the data link layer packet, the first plurality of flits not including sequence numbers.

9. A non-transitory machine-readable medium having stored thereon instructions, which if performed by a machine cause the machine to perform a method comprising:
communicating, from a first device to a second device via a link, a first plurality of flits;
changing a configuration of the link from a flit-based encoding to a packet-based encoding; and
communicating, from the first device to the second device via the link, a first plurality of packets.

10. The non-transitory machine-readable medium of claim 9, wherein the method further comprises changing the configuration of the link in response to at least one error incurred in communicating the first plurality of flits.

11. The non-transitory machine-readable medium of claim 9, wherein the method further comprises receiving at least one data link layer packet in the first device from the second device, the at least one data link layer packet to identify a last flit within the first plurality of flits that the second device correctly received.

12. The non-transitory machine-readable medium of claim 11, wherein the method further comprises in response to the at least one data link layer packet, replaying at least part of a first packet from a replay buffer as a first transaction layer packet having a first predetermined sequence number to identify the replaying.

13. The non-transitory machine-readable medium of claim 12, wherein the method further comprises receiving a second packet as a second transaction layer packet from the second device, the second packet having a second predetermined sequence number to identify a start of the second packet.

14. A system comprising:
a first device having:
a transmitter to send a first plurality of packets to a second device, each of the first plurality of packets having a packet sequence number; and
a control circuit coupled to the transmitter to cause the transmitter to change from encoding according to a packet-based encoding to a flit-based encoding, wherein in response to the encoding change, the transmitter is to send a first data link layer packet to the second device to indicate a sequence number of a first flit to be sent to the second device with the flit-based encoding;
a link coupled between the first device and the second device; and
the second device coupled to the first device via the link.

15. The system of claim 14, wherein the first device further comprises a receiver to receive a second data link layer packet from the second device, the second data link layer packet to indicate a last packet of the first plurality of packets that the second device correctly received and a sequence number of a first flit to be sent to the first device from the second device with the flit-based encoding.

16. The system of claim 15, wherein the control circuit is, in response to the second data link layer packet, to track sequence numbers of incoming flits from the second device, the incoming flits not including explicit sequence numbers.

17. The system of claim 14, wherein the transmitter is to send the first plurality of packets having xb/yb encoding and send a first plurality of flits having pulse amplitude modulation encoding.

18. The system of claim 17, wherein the transmitter is to send the first plurality of packets at a first link speed and send the first plurality of flits at a second link speed, the first link speed less than the second link speed.

19. The apparatus of claim 1, wherein the transmitter to send at least one of the first plurality of flits comprising a plurality of transaction layer packets.

20. The apparatus of claim 1, wherein the transmitter is to send the first plurality of flits having pulse amplitude modulation encoding.

* * * * *